United States Patent [19]

Boschetti et al.

[11] 4,279,254
[45] Jul. 21, 1981

[54] ULTRAVIOLET LIGHT CONTROL

[75] Inventors: Armando Boschetti, Bryan, Ohio; David J. Snoek, Grand Rapids, Mich.

[73] Assignee: Paul B. Elder Company, Bryan, Ohio

[21] Appl. No.: 956,202

[22] Filed: Oct. 30, 1978

[51] Int. Cl.³ .............................................. A61N 5/06
[52] U.S. Cl. .................................... 128/395; 250/372; 315/151; 340/600
[58] Field of Search ............... 128/395, 396, 372, 908; 315/151; 219/358, 502; 340/573, 600; 250/365, 372

[56] References Cited

U.S. PATENT DOCUMENTS

| 3,014,156 | 12/1961 | Osterhammel et al. | 128/395 X |
| 3,093,734 | 6/1963 | Just | 250/365 |
| 3,360,650 | 12/1967 | Lawrence | 315/151 X |
| 3,648,706 | 3/1972 | Holzer | 128/395 |
| 3,699,432 | 10/1972 | Brown | 128/908 X |
| 3,710,115 | 1/1973 | Jubb | 250/372 |
| 3,818,266 | 6/1974 | Vital et al. | 315/151 |
| 3,851,970 | 12/1974 | Adler et al. | 250/372 X |
| 3,917,948 | 11/1975 | Strutz | 250/372 |
| 3,967,124 | 6/1976 | Strutz | 250/372 |
| 4,010,372 | 3/1977 | Adler et al. | 250/372 |

FOREIGN PATENT DOCUMENTS

2550327 5/1977 Fed. Rep. of Germany ........... 128/395

Primary Examiner—Lee S. Cohen
Attorney, Agent, or Firm—Gordon W. Hueschen

[57] ABSTRACT

A system designed for more safely administering natural or induced light radiation to the skin of a subject, and having a control system adapted to monitor the instantaneous intensity of the ultraviolet light received by a subject being treated, wherein the instantaneous intensity is integrated and converted to a digital pulse output. The pulse rate is proportional to the instantaneous intensity. The pulses are counted to accumulate the total ultraviolet energy per unit area received by the subject. The apparatus is so controlled that when the total energy received by the subject reaches a predetermined preset value, the subject or doctor is alerted or notified either audibly or visually, e.g., when an ultraviolet lamp source is employed the lamp or lamps may automatically be turned off. In an improved embodiment a minute timer is provided in the circuit and has a switch to turn off the lamps after a predetermined period of time has elapsed as a safety precaution in case of failure of the ultraviolet light sensor and integration system. Additional safety features are provided to turn off lamps if fault occurs or when the ultraviolet sensor is accidentally obscured by the hand of the subject. In further improved embodiments, a manual switch is provided for turning the lamps on momentarily for measuring the intensity of the ultraviolet light acting on the photoelectric cell prior to treatment, and a reset circuit is provided for preventing identical dosages from being given inadvertently to successive patients.

14 Claims, 6 Drawing Figures

ULTRAVIOLET LIGHT CONTROL

FIELD OF INVENTION AND PRIOR ART

The present invention relates to devices for providing ultraviolet light for treating a subject, and is more particularly concerned with a device for monitoring the actual amount of ultraviolet energy applied to the subject and automatically turning off the ultraviolet lamps when a predetermined amount of energy has been applied.

Ultraviolet light therapy has long been used both for applying a tan to the skin of a subject and for treating the skin of the subject for certain diseases for which ultraviolet light has therapeutic value. To control the amount of total ultraviolet light energy received by the subject, it has been conventional to use a timer which, after a predetermined period, either provides an alarm or turns off the lamps, or both.

More recently it has been found that the physiological effect of ultraviolet light may be greatly sensitized or accelerated by administering certain drugs to the subject prior to exposure to ultraviolet light, either topically or internally. This permits a certain degree of physiological treatment to be accomplished in a far shorter time than when ultraviolet light is applied in the absence of such drugs. Among these drugs are those originally developed for treating psoriasis. Representative drugs are certain psoralen derivatives, e.g., Methoxsalen and Trioxsalen, marketed by Thomas C. Elder, Inc. When this method of providing ultraviolet radiation is utilized, it is extremely important that the amount of radiation energy received by the patient be carefully controlled within certain limits to prevent overexposure and its attendant injury. The use of timers alone may not provide the necessary precision, since the intensity of the light produced by the ultraviolet lamps may vary with the age of the lamps and with changes in the voltage of the electrical main.

OBJECTS OF THE INVENTION

It is accordingly an object of the invention to provide apparatus having an ultraviolet light sensor which automatically measures the instantaneous intensity of the ultraviolet light reaching the patient.

It is additionally an object of the invention to provide for the continual measurement of the total amount of ultraviolet light energy received by a unit area of the skin of the patient, and to notify the subject, e.g., by turning the ultraviolet lamps off automatically, or otherwise, after a predetermined amount of radiation energy has been received.

It is an additional object of the invention to provide a secondary means for turning off the ultraviolet lamps as a safety measure in case of malfunction of the electronic portion of the apparatus which measures the total amount of energy received.

It is still an additional object of the invention to provide safety devices to prevent injury to the patent in the event of a malfunction of the apparatus or in case of the accidental obscuring of the ultraviolet light sensing device used to measure intensity.

It is an additional object to provide means for measuring the intensity of the ultraviolet light prior to treatment.

These and other objects, advantages and functions of the invention will be apparent upon reference to the specification and to the attached drawings illustrating the preferred embodiments of the invention, in which like parts are identified by like reference symbols in each of the views.

BRIEF DESCRIPTION OF THE INVENTION

According to the invention, an ultraviolet radiation apparatus is provided having an ultraviolet light sensor which is mounted on the subject, in the light unit, or adjacent to the subject. The sensor provides an electrical current signal proportional to the intensity of the ultraviolet light impinging upon its detecting element, which current is amplified and transformed into digital pulses by the integrator. The pulse frequency is proportional to the intensity of the original current. The pulses are counted to represent the total radiation received during a given period of time. When the total radiation energy reaches a certain predetermined value, the subject is notified, e.g., by apparatus which automatically turns off the ultraviolet lamps. An additional timing circuit is used as a safety device and pre-set for a certain period. Whichever control reaches the predetermined value turns off the lamps. Additionally, means is provided for turning on the lamps and measuring their intensity prior to treatment.

DETAILED DESCRIPTION OF THE INVENTION

Figure 1:
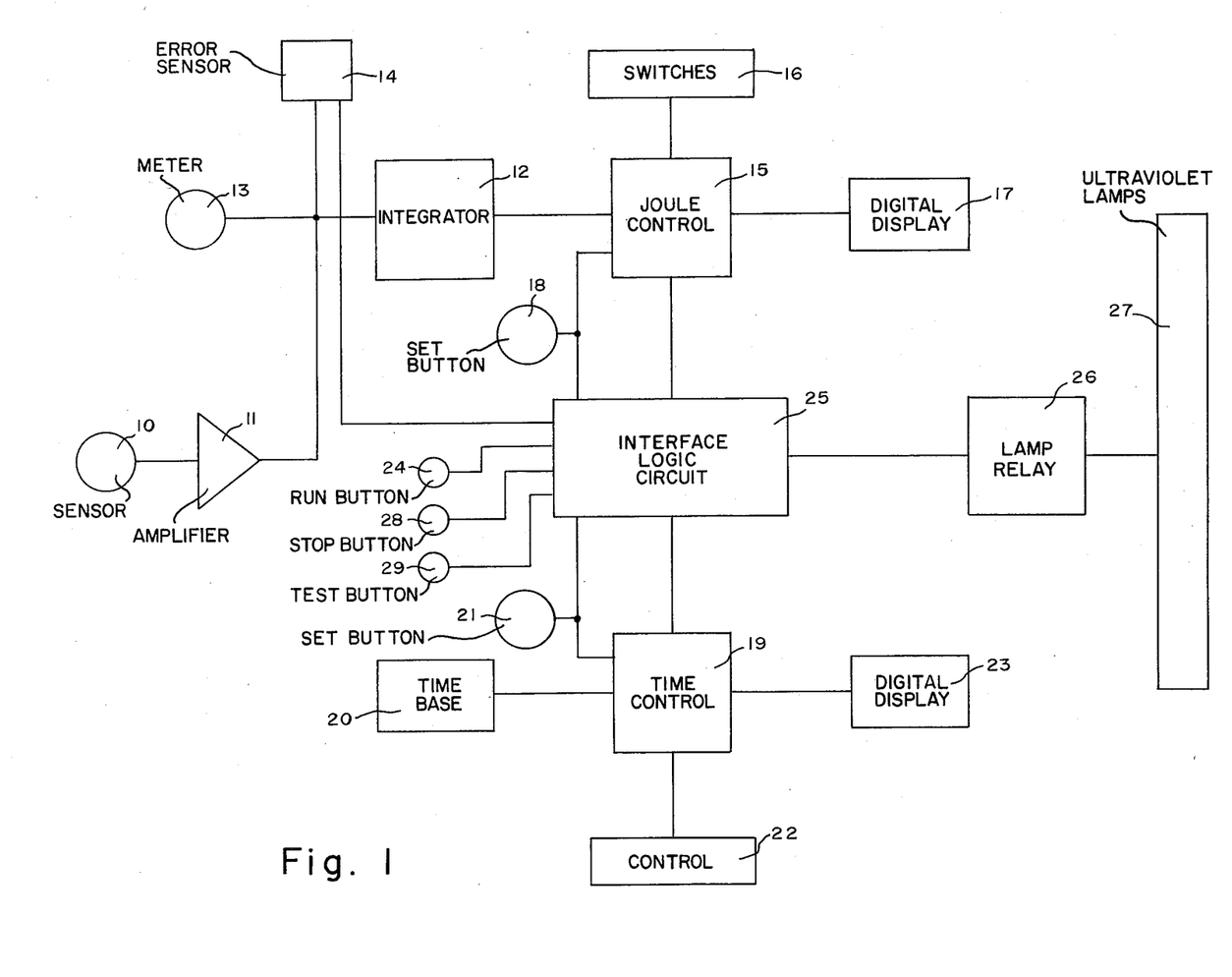
FIG. 1 is a schematic block diagram of the apparatus.

Referring to FIG. 1, a block diagram of the present invention is shown and comprises a photovoltaic sensor 10 having a suitable filter to permit only ultraviolet light energy, and particularly ultraviolet A energy having a wave length of from 320 to 400 nanometers. The filtered light produces a current in the sensor which goes to an operational amplifier 11 for proper conditioning. From the amplifier 11 the output goes to an integrator 12. A light output meter 13 is provided for testing. The signal also goes to an error sensing assembly 14.

The light output meter 13, when properly calibrated, gives a reading in terms of milliwatts per sq. centimeter. This information is used together with a chart and permits the setting of an independent timer to give the desired exposure as a safety factor. The error sensing module 14 indicates a fault in the function of the apparatus and, when necessary, turns off the lamps either when the sensor has lost output or when the patient has accidentally caused the lights to be blocked to the sensor. An open or defective sensor also is sensed as an error and causes the output from the lamps to be removed. The integrator 12 receives the information which represents the amount of light received by the sensor and converts it to a pulse train. The output of the integrator 12 is fed to a joule control 15. In the joule control 15, information is programmed as to the maximum desired joules/cm$^2$ to be applied to the subject, by means of the thumb wheel switches 16. The programmed information set by the thumb wheels 16 is continually compared with the accumulated signal from the sensor 10. When the two quantities become equal, a signal is provided to the relays to turn the lamps off.

A digital display 17 also receives its information from the joule control when the set button 18 is depressed. The amount set by the thumb wheel is displayed on the joule digital display 17.

As the energy is accumulated and the output is received from the integrator 12, the digital display will gradually be reduced from its original setting and the energy to the lamps will be removed when the digital display has diminished to a value of zero.

The functions set out in the lower part of FIG. 1 illustrate that an input to a time control 19 is provided by a time base 20. When the operator pushes a "set" button 21, the amount of time set into the thumb wheel control 22 is displayed on a digital display 23 in terms of minutes.

When the treatment is initiated by pushing the "run" button 24, the signal from the time base is fed to the minute control 19 and the digital display 23 diminishes in value. When this display reaches a value of zero, an interface logic circuit 25 removes the signal to the lamp relay 26, thereby turning off the ultraviolet lamps 27. The system is so arranged that when either the joule control or the minute control reach the pre-set condition, that control assumes the command position and turns off the lamps. The circuitry of the joule control 15, the time control 19 and the information on the time chart from which the minute control 19 is set, are so organized that the joule control will be the predominate control, and the time control assumes a subsidiary position as a safety device.

The sensor 10 is a special photovoltaic photocell which is a self-generating photocell. However, other types of photocells may be utilized. The photocell 10 is incorporated into an aluminum housing (not shown) which provides it with a considerable amount of protection in the normal handling anticipated. The assembly is provided with a band or other attachment means so that it can be mounted on the body of the patient as desired by the physician.

When properly positioned the sensor is arranged so that it receives light output from the lamps through an included angle of approximately 90 to 180 degrees, and therefore is exposed to substantially the same amount of exposure as the surrounding body surface. Under normal conditions of treatment of the entire body, the sensor is generally placed in the region of the body trunk. This region is in closer proximity to the ultraviolet radiation and therefore receives larger amounts of radiation than the remainder of the body.

It has been found that the amount of radiation from the lamps varies as the position along the length of the lamp varies. The energy output diminishes as the ends of the lamps are approached. The present sensor system measures actual radiation applied during treatment rather than depending on a reading taken prior to the treatment to the patient. The present method of monitoring by means of a sensor is particularly desirable when a partial treatment is to be made to a patient.

Prior to treatment, a value for the desired joule treatment is set by means of the thumb wheel switches 16 and, additionally, a value for the time of the dosage is set into the thumb wheel switches 22. The set button 18 for the desired joule setting is then depressed by the operator. The amount of joules desired then appears on the digital display 17. The operator then depresses the set switch 21 for the minute control. The digital display 23 then shows the amount of time set in for the treatment. The run button 24 is then depressed to begin the treatment. The run button will not turn on the lamps 27 until both the joule set and the minute set have been established. Once the treatment has begun by pushing the run button, the two set switches 18 and 21, as well as the thumb wheel switches 16 and 22, are disabled and any readjustment of these switches will not affect the treatment which is being administered. The only control which is active during treatment is the stop button 28, which may be used at any time to stop treatment. Treatment may again be administered by pressing the run button. Prior to treatment the lamps may be turned on for testing by the test button 29.

During treatment, if the patient inadvertently blocks the sensor 10 with an arm or a hand, this condition is sensed in the control circuitry and causes the lamps to be turned off. A small pilot lamp may be provided which lights up on the control panel to indicate to the operator that the fault is due to a lack of sensor output. This detector also protects against problems with a sensor which has an open lead or is otherwise defective. Following the correcting of the defective condition, the system can again be started by pushing the run button 24.

The sensor 10, which senses the amount of energy received, has additional features to prevent misuse. If for any reason the sensor should become disconnected or defective during a treatment, the treatment will be interrupted after a period of five seconds in this condition. When this type of shutdown occurs, the sensor error lamp 14 lights up, indicating that either there is a fault in the circuit or the lamp output has fallen below six milliwatts per sq. centimeter on the sensor for a period of five seconds. A similar shutdown of the system will occur if the patient accidentally covers the sensor which receives the light energy for measurement. A relaxation or exercise movement of the arm past the front of the sensor will not cause shutdown of the system. Operation will continue. A shutdown of the system due to sensor error will cause the system to remain shut down until the error is corrected and the run button depressed. If the shutdown has occurred as the result of the patient's covering of the sensor, the attendant informs the patient of the condition and merely once again depresses the run button 24 to continue treatment.

The sensor 10 is chosen as a self-generating type of sensor, and therefore cannot be detrimental to the patient in any way. Should any wear cause an open wire or bad connection, the amount of electrical energy to which the patient may be exposed would not be in excess of two volts vc.

FIGS. 2 through 6 are schematic electrical drawings of the various portions of the apparatus according to the present invention shown in block diagram in FIG. 1. The components shown are all conventional off-the-shelf components which are known to those skilled in the art, and which may be purchased from electronic supply concerns. In some cases where the components such as flip-flop oscillators or monostable multi-vibrators are shown individually, they may be utilized as a matter of convenience as portions of a large multi-unit integrated circuit. The free leads shown in the drawings have been given numerals and are to be connected with the like-numbered free leads of the other figures. Additionally, where applicable, the terminal connections to the various integrated circuits have been indicated in the drawings.

Figure 2:
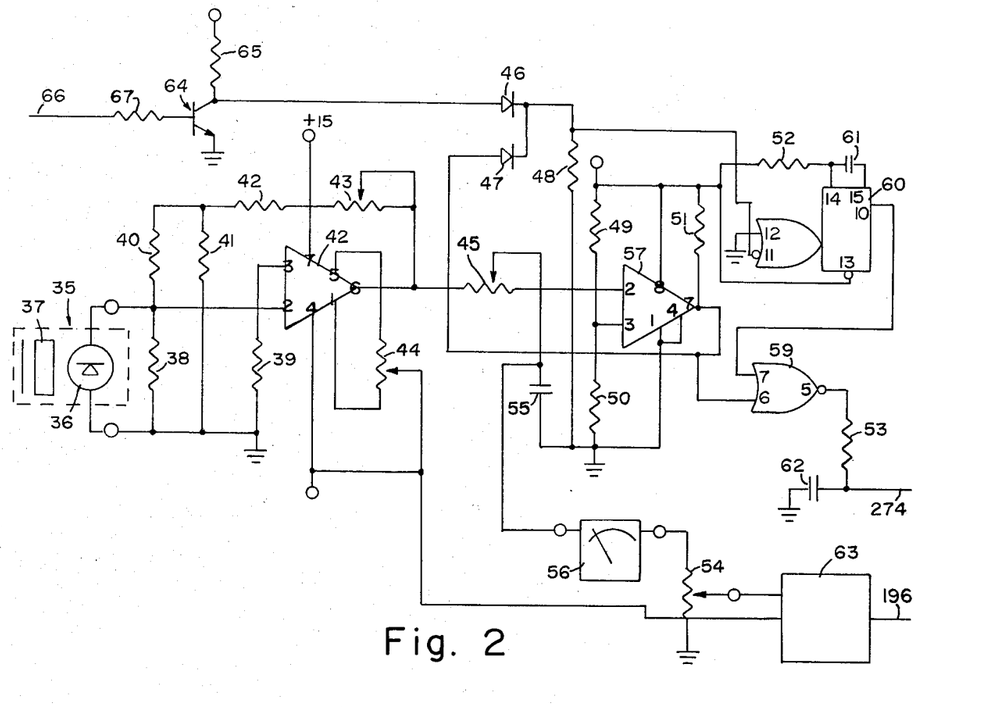
FIG. 2 is a schematic electrical diagram showing the photoelectric call, integrator, and associated circuitry.

Referring to FIG. 2, the ultraviolet light sensing and processing portion of the apparatus is shown comprising a sensor assembly module 35 having mounted in a housing a sensor photoelectric cell 36, and an ultraviolet light-passing filter and diffuser 37. The output signal goes to a resistor array comprising resistors 38, 39, 40, and 41. The signal then goes to an operation amplifier 42, potentiometers 43, 44, and 45, diodes 46 and 47, resistors 48, 49, 50, 51, and 52, a potentiometer 54, a filter condenser 55, and a microammeter 56. The signal from the amplifier 42 goes to a comparator amplifier 57. The signal from the diodes 46 and 47 goes to a portion of a dual one shot and a NOR gate 59 which is a portion of a quad NOR gate. The circuit additionally includes a five second flip-flop integrated circuit and timing condenser 61 and filter condenser 62. The lead from the potentiometer 54 goes to an analog-to-digital converter 63 which converts the analog current signal to a digital current signal. Additional circuitry comprises a transistor 64 and resistor 65, and resistor 67 terminating in a lead 66. A further free lead 274 is connected to the resistor 53 and condenser 62.

Figure 3:
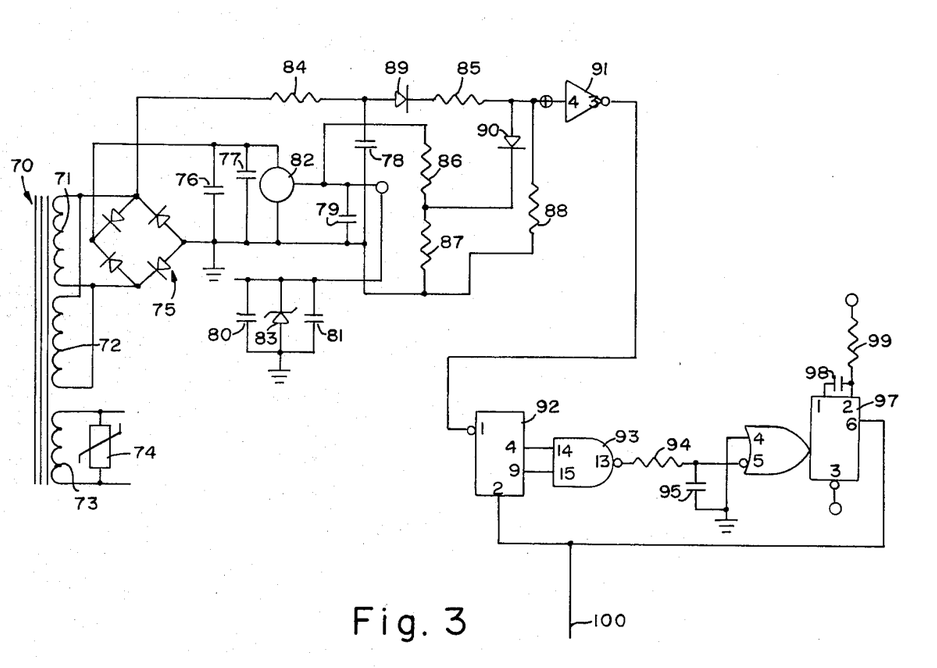
FIG. 3 is a schematic electrical diagram of a time base clock and associated circuitry.

Referring to FIG. 3, a power supply and time base clock is shown comprising a transformer 70 having secondary windings 71, 72, and 73. A varistor 74 controls the voltage of the winding 73. A bank of diodes 75 arranged as a bridge rectifier is connected to the windings 71 and 72 and its output is connected to filter condensers 76, 77, 78, and 79. Additional filtering is supplied by condensers 80 and 81. A voltage regulator 82 controls the voltage across one branch of the circuit. An additional filter and control bank comprises condensers 80 and 81 and zener diode 83. Pickoff circuitry for the time base circuit is provided by resistors 84, 85, 86, 87, 88, diodes 89 and 90, along with ripple counter 92, NAND gate 93, and one-shot 97, which acts as a pulse divider network. Associated components include resistors 99 and 94, and timing condensers 95 and 98. Invertor 91 is also a part of this circuit. A lead 100 is connected from the output of the integrated circuit 97 to the count input of integrated circuit 114.

Figure 4:
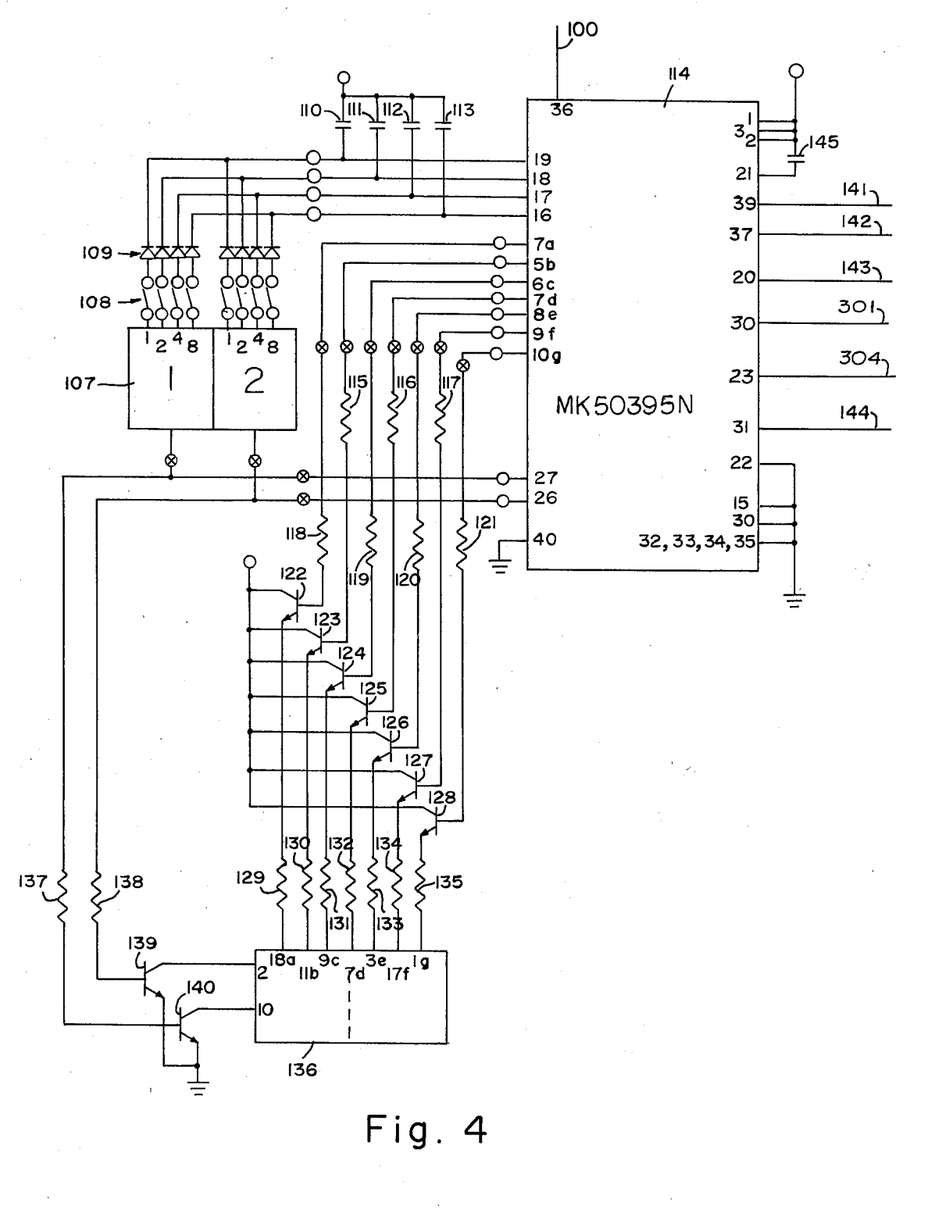
FIG. 4 is a schematic diagram of a minute control and associated circuitry.

Referring to FIG. 4, the timing portion of the circuit for establishing minute control is shown and comprises a digital readout assembly 107 which is set by a thumb wheel switch array 108 connected through a series of diodes 109, bypass condensers 110, 111, 112, and 113, and to a minute counter integrated circuit 114. The integrated circuit 114 is additionally connected through resistors 115, 116, 117, 118, 119, 120, and 121, to a bank of transistors 122, 123, 124, 125, 126, 127, and 128, through a series of resistors 129, 130, 131, 132, 133, 134, and 135 to a digital readout assembly 136. The digital readout 136 is also connected to the integrated circuit 114 through resistors 137 and 138, and transistors 139 and 140. Leads 141, 142, 143, and 144 connect the integrated circuit 114 to circuits shown in other figures having similar lead numbers. Condenser 145 is a timing condenser to set the scan rate for the multiplexing circuits internal to integrated circuit 114.

Figure 5:
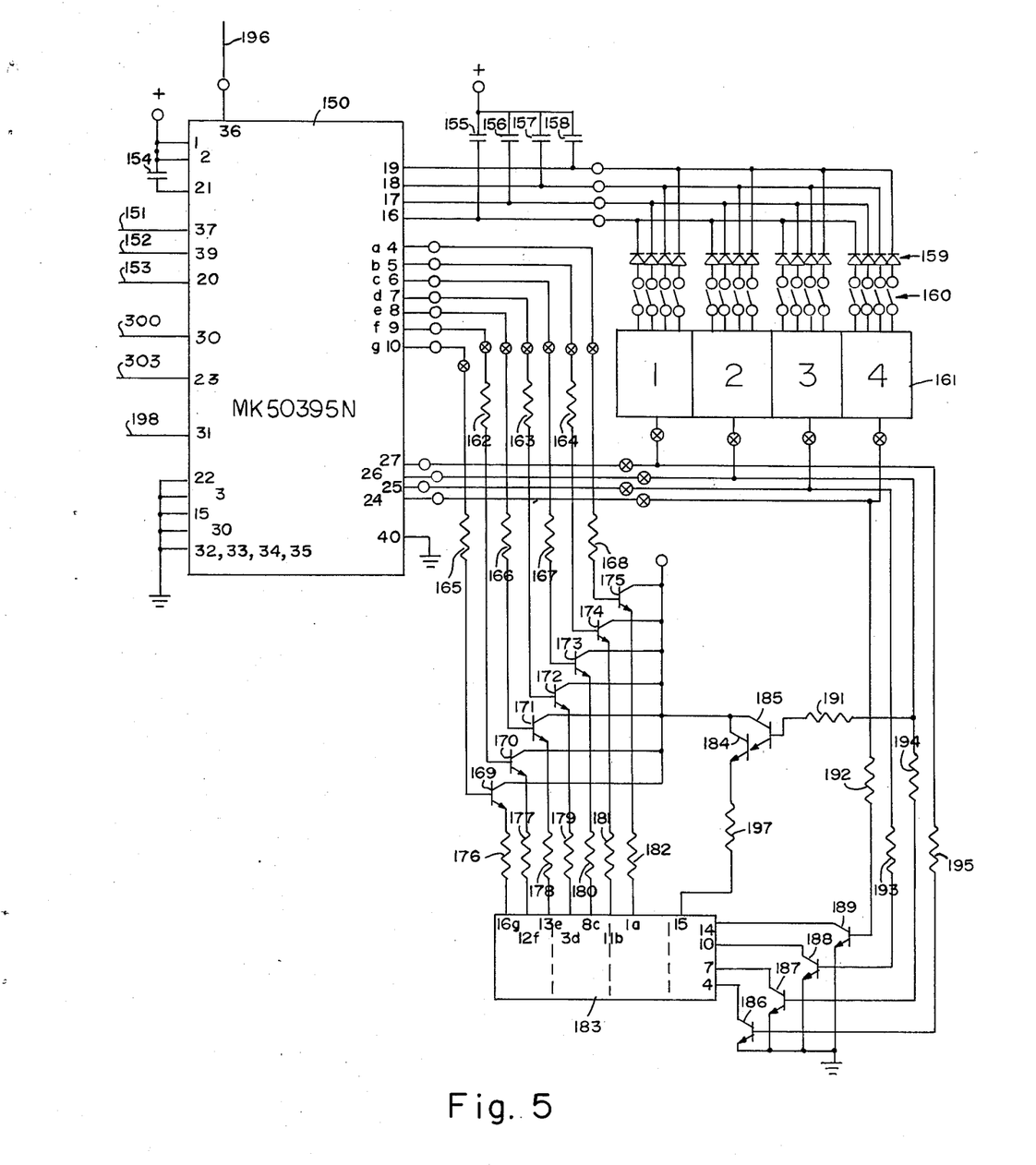
FIG. 5 is a schematic electrical diagram of a joule control and associated display circuitry.

Referring to FIG. 5, the apparatus for counting the total integrated energy of the ultraviolet light striking the sensor in terms of joules/cm$^2$ of energy comprises a joule control counter integrated circuit 150 having leads 151, 152, and 153 connected to similarly numbered leads in other figures. The integrated circuit 150 is bypassed by bypass condensers 154, 155, 156, 157, and 158. The bypass leads are connected through a plurality of diodes 159 through a bank of thumb wheel switches 160 to a digital readout 161. Other terminals of the integrated circuit 150 are connected through resistors 162, 163, 164, 165, 166, 167, and 168 to a bank of transistors 169, 170, 171, 172, 173, 174, and 175, which are in turn connected to a plurality of resistors 176, 177, 178, 179, 180, 181, and 182 to another digital readout 183. The digital readout is also connected by means of transistors 184, 185, 186, 187, 188, and 189 and resistors 191, 192, 193, 194 and 195 to terminals of the integrated circuit 150. A lead 196 is also connected to the integrated circuit 150 as is a lead 198. A resistor 197 connects the digital readout 183 with the transistor 184.

Figure 6:
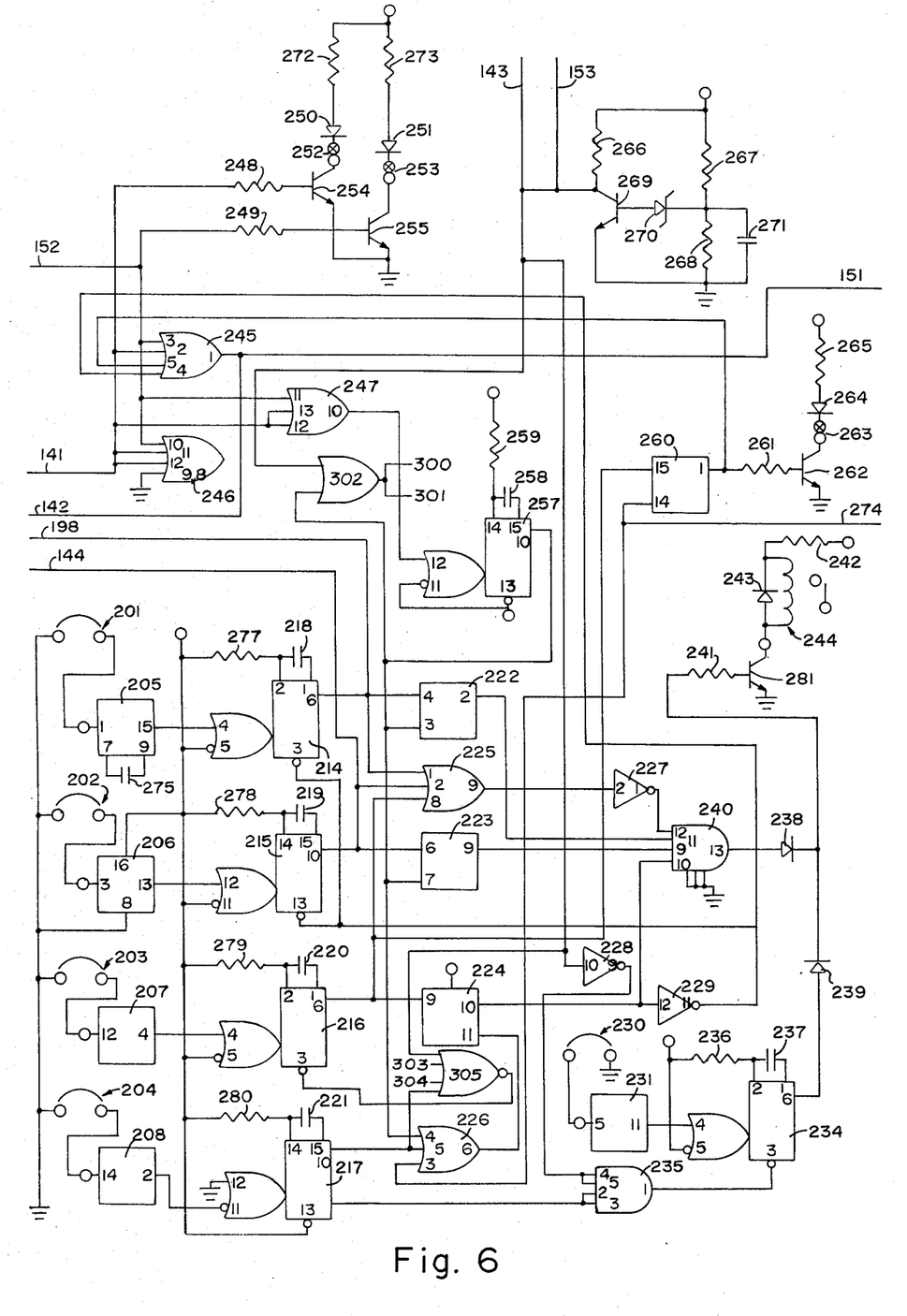
FIG. 6 is a schematic electrical diagram of the interface logic circuit.

Referring to FIG. 6, the control portion of the circuit is illustrated comprising a push button switch 201 for setting the value of total energy in joules desired to be applied to the patient before the ultraviolet lamps are turned off. A push button switch 202 initiates an independent timing function to time the exposure and to turn off the lamps after a preset time has elapsed. A push button switch 203 turns on the lamp and starts the timer and joule counter function to run. A push button 204 is designed to turn off the lamps and stop other functions. A six-part integrated circuit provides contact debounce and comprises units 205, 206, 207, and 208, which are connected to 2 millisecond monostable multivibrator (one shot) integrated circuits 214 and 215, a 1 second one shot integrated circuit 216, and a 3 second one shot integrated circuit 217, integrated circuits having timing condensers 218, 219, 220 and 221. Resistors 277, 278, 279 and 280 establish, along with cooperating timing condensers 218–221, the millisecond delays of the monostable multivibrators. Further connected in the circuit are a pair of sections 222 and 223 of a four-part latching integrated circuit, and a latching circuit 224. Additionally in the circuit are OR gates 225 and 226 which are portions of a triple gate integrated circuit, and gates 227, 228, and 229 which are portions of a HEX inverter integrated circuit. A lamp test switch 230 is connected to contact debounce integrated circuit 231, which is in turn connected to one-half of a one-shot dual gate 234, which functions as a 15 second timer. Associated with the integrated circuit 234 is a resistor 236 and a timing condenser 237. Connected to the integrated circuit 234 is an AND gate 235 and through diodes 238 and 239 is an AND gate 240 which is one of a four-input dual AND gate integrated circuit.

A relay circuit comprises resistors 241 and 242, a diode 243 and a relay 244.

Another portion of the circuit comprises OR gates 245 and 246, each of which is one-half of a four-input dual gate. OR gate 247 comprises one-third of a three-input OR triple gate. Resistors 248 and 249, diodes 250 and 251, LED'S 252 and 253 and transistors 254 and 255 comprise a condition-signaling portion of the circuit. Connected to the OR gate 247 is one-half of a one shot dual reset integrated circuit 257, which is in turn timed by condenser 258 and resistor 259. A latch portion 260 of a four-part integrated circuit is connected through resistor 261, transistor 262, a LED 263, a diode 264 and a resistor 265.

Additionally in the control circuit are resistors 266, 267, and 268, a transistor 269, a zener diode 270, and a timing condenser 271. Resistors 272 and 273 are associated with the diodes 250 and 251, and the LEDS 252 and 253. A timing condenser 275 is connected to the contact debounce 205.

Briefly, the operation of the apparatus of the present invention is as follows. Referring to the beginning of the circuit shown in FIG. 2, starting at the sensor 36, the ultraviolet light passing through the diffuser and filter 37 is picked up by the sensor 36 and is converted from a light signal into a voltage. The voltage is coupled from the sensor to the amplifier 42, which is a simple amplifier. Potentiometers 43 and 44 are designed to adjust the proper level of the amplification of the amplifier 42. The amplified signal that is developed by the amplifier 42 is coupled to the potentiometer 45. The output is taken at the top of the condenser 55 and through the meter 56 and then through another level-setting potentiometer 54 to the integrated circuit 63, where the signal is converted to a digital signal. The pulses are then coupled to the integrated circuit 150, shown in FIG. 5, where they are counted. When the count that is received equals the count that is preset in the counter, an output is obtained which is coupled at lead 152 to the input of an OR gate 245, providing a high level signal through lead 151 to pin 37 of integrated circuit 150, which would inhibit further counting. It would also provide a signal to pin 37 of integrated circuit 114, inhibiting further counting of the minute counter. The output from pin 39 is also coupled to OR gate 247. When OR gate 247 changes state, it couples its changed state output to one shot 257, which is a reset circuit, to reset latches 222 and 223. When the outputs of 222 and 223 drop low due to the reset pulse, AND gate 240 output goes low, removing drive signal to transistor 281, which turns off, dropping out relay 244 and turning off the lamps.

In the block diagram FIG. 1 there is shown a time base. On the schematic of FIG. 3 it is shown as a power supply, a one shot and a NAND gate and a ripple counter. The output is coupled to integrated circuit 114, which simply counts it as a particular time rate in order to develop a number that is related to the passage of time, and corresponds to the passage of a period of time. When it reaches the number that has been presented to the counter by the way of a thumb wheel 108 that is displayed on the display 136, the lamps are turned off. The counter also provides an output at zero pin 39. That output goes to OR gates 245 and 246 and to OR gate 247. It inhibits further counting by integrated circuit 150. It further inhibits itself from counting at integrated circuit 114 by a feedback to terminal 37 and through OR gate 247. It also couples an output down to the reset one shot 257, which outputs for 2 milliseconds. This signal is coupled down to integrated circuits 222, 223 and 224, which are latches that change states, and the changed states are coupled to the AND gate 240, which changes state and removes drive from the relay driver to again turn off the lamps.

In the interface, shown in FIG. 1 as 25, and shown in FIG. 6, there are several switches. One is a joule set 201. It operates a contact debounce that operates some further gating, which is a monostable multivibrator that changes state, producing an output that is coupled into pin 31 of integrated circuit 150, causing it to load in the number that has been put on by thumb wheel 160. The minute set button 202 does the same thing for providing an output to pin 31 of integrated circuit 114 that allows loading in the number that is set at thumb wheel 108.

To start the operation of the whole system, the run button 203 is pushed in to actuate a contact debounce 207 that operates a monostable which ultimately sets the relay circuit and starts everything counting and running. Depressing the push button 204 turns off all operations.

A lamp test button 230 operates to actuate integrated circuit 231 and integrated circuit 234 to actuate the relay driver to operate the lamps for testing. The interface 25 of the block diagram is in effect a logic circuit. It takes output from the joule control or counter integrated circuit and couples it to the lamp relay and to the minute control. The minute control output is also coupled to the lamp relay joule control. When an output from the joule control is obtained, indicating the correct number of joules have been read, it drops out the lamp relay, causing the lamps to be turned off, and also inhibits further counting by the minute control. Similarly, when the minute control output occurs, indicating the proper time has passed, it is coupled through the logic circuit to the lamp relay to de-energize the lamp relay and shut off the lamp, and also to the joule control in order to deactivate the joule control. The logic circuit also has inputs for causing the circuit to run, for stopping the prior circuit, for testing the lamp, and also there is a set input to the logic control for setting both the necessary time period and the minute control, and for setting the necessary total count in the joule control. The error sensing circuit 14 is shown in FIG. 2 and comprises amplifier 57 and the associated resistor network and a 5 second monostable 60 and a NOR gate 59. The circuit senses the output level of the light circuit and the sensor and, when the signal becomes too low, determines that there is some kind of an error and shuts down. When it shuts down, it actuates an error sensor light-emitting diode 263 through a resistor 265 to provide a warning signal, and it also further goes through the interface, terminating further counting and shutting off the system.

In the interface circuitry (FIG. 6) is the apparatus for remembering a previous patient's dosage and disabling the machine's operation should an operator inadvertently attempt to use the device without proper setup.

The reset signal from integrated circuit 257, or the power turn-on signal from the network associated with transistor 269, will cause the thumb wheel data to be entered into the data registers of integrated circuit 114 and 150 by high signals at the input of integrated circuit 302, which will result in high signals to the load register inputs 301 and 300 of integrated circuits 114 and 150, respectively.

If the operator attempts to set the counters of integrated circuits 114 or 150 to the same number which has been automatically entered into the registers, the equal output 303 and 304 will cause a low signal at the output of integrated circuit 305, a NOR gate, which will in turn disable the operation of the monostable 216, preventing the run switch 203 from activating the rest of the circuitry. Moreover, integrated circuit 305 also disables the monostable 216 if the stop button is simultaneously depressed at power turn-on.

The apparatus of the present invention has a number of advantages over apparatus used for the same purpose in the art. First, photoelectric means is provided for mounting on the patient which measures the instantaneous intensity of the ultraviolet light applied at the actual distance at which the patient is placed. The signal from the photoelectric cell indicating the instantaneous intensity is integrated with a time base signal to provide an integrated signal which is calibrated to correspond to the actual energy in joules per square centimeter applied to the patient during a given period. The signal is monitored against a predetermined setting representing the energy which is desired to be applied to the subject. When the desired treatment has been completed, the lamps are automatically extinguished. In an improved embodiment, an independent timing apparatus is associated with the energy measuring portion of the apparatus. A digital display of the joules desired to be applied per unit area is entered and a timing period, which has been calculated for the independent timer, representing the time that has been determined to provide the same number of joules per unit area of treatment, is entered. Both the maximum desired joules display and the minute display count toward zero when the apparatus is turned on. Whichever display comes to zero first extinguishes the lamps. The independent timer monitor is utilized as a safety measure in the event that the joule counter does not operate properly. Generally, the joule counter shuts the system down. However, in the event of an abnormality not detected by the joule counter and its assembly, the independent timer acts as a safety measure and turns off the lamps at the desired time.

Additionally, in a further embodiment, means is provided whereby a switch may be used to turn on the lamps prior to treatment, and the intensity of the radiated light, as measured by the photoelectric cell, is displayed on an accurate meter which is calibrated to show milliwatts per square centimeter.

It is understood that with appropriate circuit modifications one thumb wheel could be used to set both integrated circuits 114 and 150 instead of using the two thumb wheels 108 and 160, and that one display could be used to display, at the operator's discretion, either minutes remaining or joules/cm$^2$ remaining, instead of using the two displays 136 and 183, as will be apparent to one skilled in the art.

Although the components herein are conventional, they may conveniently be the following commercial items:

Amplifier 42—AD 741 JH
Comparator 57—LM 311 H
Contact debounces 205—208—MC 14490 FP
One-shot duals such as 214—217, and others—MC 14538 BCP
Ripple counter—MC 14024 BCP
Triple gate—MC 14572 BCP
Latch guard—MC 14043 BCP
Four input or dual gate—MC 14072 BCP
Three input or triple gate—MC 14075 BCP
Four input AND dual gate—MC 14082 BCP
Transistor array—ULN 2081 A
Counters—MK 50395 N
Converter 63—VT 1560 A It should also go without saying that the device of the present invention could also employ, as means for notifying the subject or patient in the following claims, instead of means for turning off the lamps when the light energy reaches a pre-determined value, alternate means for alerting the patient and/or doctor by a signal, either audible or visual or both, and that the device of the invention is equally applicable to protection against ultraviolet light rays from any source, including natural sources, and is not limited to ultraviolet light generated by lamps, and that the device may moreover readily be placed in portable form with its own power pack.

For example, in the case of using the device to monitor sun exposure, the device may be connected to a battery which activates an audible signal to inform the subject that the predetermined exposure has been reached.

It is to be understood that the invention is not to be limited to the exact details of operation, structure, or circuitry shown and described in the specification and drawings, since obvious modifications and equivalents will be readily apparent to one skilled in the art.

We claim:

1. Apparatus for rendering more safe the exposure of the skin of a subject to ultraviolet light radiation, comprising means for monitoring the ultraviolet light radiation energy per unit area impinging upon the subject, and providing notification when a predetermined amount of energy per unit area has impinged upon the subject, said monitoring means comprising:

photoelectric means providing an analog electrical signal proportional to the intensity of the ultraviolet light which impinges thereon, solid state integrated circuit signal converting means for converting the analog electrical signal from said photoelectric means to a digital electrical signal having a frequency proportional to the intensity of the analog electrical signal, solid state integrated circuit counting means receiving said digital signal and counting the pulses of said signal to provide a measure of the total amount of ultraviolet energy received per unit area during a measured period of time, and means operatively connected to said circuit counting means adapted to be set to the desired amount of radiation applied per unit area of the subject and to provide notification when the set amount of total energy per unit area has been attained, wherein said apparatus includes one or more ultraviolet lamps and means for electrically energizing said lamps, wherein said photoelectric means is adapted to be mounted on the body of said subject, and which includes a control switch having associated digital display for setting the total amount of ultraviolet light radiation per unit area desired to be applied to the subject, said control switch being operatively connected to said counting means and being so operatively connected that counted pulses of said counting means gradually reduces the reading on the display to indicate the total amount of energy per unit area still remaining to be applied, means for generating an electrical signal when the reading on said display reaches zero, and means actuated by said latter electrical signal adapted to turn off said ultraviolet lamps.

2. Apparatus of claim 1, wherein a solid state operational amplifier is associated with said photoelectric means to amplify the signal from said photoelectric means and to provide an amplified signal to said signal converting means.

3. Apparatus of claim 1, comprising filter means adapted to pass substantially only ultraviolet light to said photoelectric means.

4. Apparatus of claim 3, additionally having means for temporarily turning on said lamps prior to treatment, and metering means for measuring the strength of the signal derived from said photoelectric means to determine the intensity of the radiated ultraviolet light from said lamps.

5. Apparatus of claim 1, wherein the display of the actual energy remaining to be applied is calibrated in terms of joules/cm².

6. Apparatus of claim 1, having means for detecting faults in the monitoring means, and means for turning off said lamps when a fault is detected.

7. Apparatus of claim 6, having means for detecting an abnormal drop in the signal from said photoelectric means and for turning off said lamps when such a drop is detected.

8. Apparatus of claim 1, additionally having an independent timing means for turning off said lamps when a preset period of time has elapsed.

9. Apparatus of claim 8, having digital readout means provided for displaying the actual remaining time.

10. Apparatus of claim 1, additionally having means for temporarily turning on said lamps prior to exposure of a subject thereto, and metering means for measuring the strength of the signal derived from said photoelectric means to determine the intensity of the ultraviolet light radiated from said lamps.

11. An apparatus for rendering more safe the exposure of the skin of a subject to ultraviolet light radiation, comprising means for monitoring the ultraviolet light radiation energy per unit area impinging upon the subject, and providing notification when a predetermined amount of energy per unit area has impinged upon the subject, said monitoring means comprising:

means for applying ultraviolet light radiation with a particular dosage setting, photoelectric means providing an analog electrical signal proportional to the intensity of the ultraviolet light which impinges thereon, means for converting the analog electrical signal to a digital electrical signal having a frequency proportional to the intensity of the analog electrical signal, means for counting the pulses of said digital electrical signal to provide a measure of the total amount of the ultraviolet energy received by the subject per unit area during the period of exposure, means operatively connected to said counting means for providing notification when the total amount of ultraviolet light radiation applied per unit area of the subject reaches a predetermined value, means for remembering the radiation dosage setting for a first subject, means for comparing the next subsequent dosage setting with the dosage setting for said first subject, and means responsive to said comparing means for blocking the continued operation of said apparatus when said comparing means shows identical dosage settings for precluding a next preceding dosage from inadvertently being given to a subject immediately following said first subject.

12. Apparatus of claim 11, wherein said means for remembering is an integrated circuit containing a data register.

13. Apparatus of claim 11, wherein said means for comparing is an integrated circuit containing a comparator.

14. Apparatus of claim 11, wherein said means for blocking is an integrated circuit having means for removal of an enabling signal.

* * * * *

UNITED STATES PATENT AND TRADEMARK OFFICE
CERTIFICATE OF CORRECTION

PATENT NO. : 4,279,254
DATED : July 21, 1981
INVENTOR(S) : Armando Boschetti and David J. Snoek It is certified that error appears in the above—identified patent and that said Letters Patent is hereby corrected as shown below:

Col. 5, line 12; "operation" should read — operational —
Col. 5, line 20; "circuit and" should read — circuit 60 and —

Signed and Sealed this

Twenty-third Day of February 1982

[SEAL]

Attest:

GERALD J. MOSSINGHOFF

Attesting Officer     Commissioner of Patents and Trademarks